United States Patent
Ovesen et al.

(10) Patent No.: US 7,097,552 B2
(45) Date of Patent: Aug. 29, 2006

(54) METHOD AND SYSTEM FOR GAS STUNNING OF POULTRY FOR SLAUGHTER

(75) Inventors: Henrik Ovesen, Ebeltoft (DK); Svend Lindholst, Lystrup (DK); Massimo Zanotti, Brescia (IT)

(73) Assignees: Linco Food Systems A/S, Trige (DK); Linco Italia s.r.l., Brescia (IT)

( * ) Notice: Subject to any disclaimer, the term of this patent is extended or adjusted under 35 U.S.C. 154(b) by 0 days.

(21) Appl. No.: 10/673,136

(22) Filed: Sep. 30, 2003

(65) Prior Publication Data
US 2005/0191953 A1  Sep. 1, 2005

(30) Foreign Application Priority Data
Oct. 1, 2002  (DK) .............................. 2002 01466

(51) Int. Cl.
*A22B 3/00* (2006.01)

(52) U.S. Cl. .......................................... 452/66; 452/53
(58) Field of Classification Search ................. 452/53, 452/57, 58, 59, 60, 61, 62, 66
See application file for complete search history.

(56) References Cited

U.S. PATENT DOCUMENTS

| | | | | |
|---|---|---|---|---|
| 2,526,037 A * | 10/1950 | Murphy | ....................... | 452/66 |
| 2,733,477 A * | 2/1956 | Murphy | ....................... | 452/66 |
| 2,737,683 A * | 3/1956 | Regensburger | ............. | 452/66 |
| 3,118,174 A * | 1/1964 | Hughes | ....................... | 452/56 |
| 3,135,017 A * | 6/1964 | Murphy et al. | ............... | 452/53 |
| 3,487,497 A * | 1/1970 | Jorgensen et al. | ............ | 452/53 |
| 3,828,396 A * | 8/1974 | Wernberg | .................... | 452/66 |
| 4,888,855 A * | 12/1989 | Haumann et al. | ............. | 452/53 |
| 5,186,677 A * | 2/1993 | Christensen et al. | ......... | 452/66 |
| 5,487,699 A * | 1/1996 | Tyrrell et al. | ................. | 452/66 |
| 5,643,072 A * | 7/1997 | Lankhaar et al. | ............. | 452/66 |
| 5,788,564 A * | 8/1998 | Chamberlain | ................ | 452/66 |
| 5,902,177 A * | 5/1999 | Tessier et al. | .............. | 452/156 |
| 5,975,029 A * | 11/1999 | Morimoto et al. | .......... | 119/843 |
| 6,056,637 A * | 5/2000 | Freeland et al. | ............ | 452/183 |
| 6,126,534 A * | 10/2000 | Jacobs et al. | ................. | 452/66 |
| 6,135,872 A * | 10/2000 | Freeland et al. | .............. | 452/66 |
| 6,473,287 B1 * | 10/2002 | Van Ochten et al. | ....... | 361/232 |

FOREIGN PATENT DOCUMENTS

| | | |
|---|---|---|
| EP | 0 622 021 A2 | 2/1994 |
| EP | 0 847 944 A2 | 12/1997 |

(Continued)

*Primary Examiner*—Peter M. Poon
*Assistant Examiner*—David J. Parsley
(74) *Attorney, Agent, or Firm*—Antonelli, Terry, Stout and Kraus, LLP.

(57) ABSTRACT

A method and a system (2) for gas stunning of animals for slaughter is described, where the animals arrive at the slaughterhouse in transport crates (6), where gas stunning of the animals is effected while they are still in transport crates (6), and where the transport crates with the animals, a number of conveyors (12, 14, 18, 20), are conveyed successively through a stunning chamber (8), where the action of the gas for stunning of the animals is adjusted by shortening or prolonging the conveying time and/or the conveying route of the said transport crates (6) through the stunning chamber (8). It is possible to optimize stunning while at the same time considering all the parameters. If the stunning condition of the animals is not optimum, it is easy to prolong or shorten the conveying time and/or the conveying route through the stunning chamber.

33 Claims, 1 Drawing Sheet

FOREIGN PATENT DOCUMENTS

| | | | |
|---|---|---|---|
| FR | 2534469 | * | 4/1984 |
| JP | 63-157930 | * | 6/1988 |
| WO | WO 94/15469 | * | 7/1994 |
| WO | WO 94/27425 | | 12/1994 |
| WO | WO 99/43581 | | 12/1998 |

* cited by examiner

METHOD AND SYSTEM FOR GAS STUNNING OF POULTRY FOR SLAUGHTER

BACKGROUND OF THE INVENTION

1. Field of the Invention

The present invention relates to a method for gas stunning of poultry for slaughter and of the kind stated in the preamble of claim 1.

2. Description of the Prior Art

Over time, many different methods have been proposed for gas stunning of poultry for slaughter arriving at the poultry slaughterhouse in transport crates, with no remarkable success. In practice however, several parameters must be considered in order to be able to optimize a method for gas stunning of poultry for slaughter.

To optimize the method, the following parameters must be considered:

Conveying speed (capacity of the system)

Size and number of birds in the transport crates.

The physical condition of the poultry flock which is determined by continuously observing variations in a stress condition or resistance of the poultry that are significant for determining the time necessary for stunning the poultry which further may vary because of conditions in broiler houses, temperatures, transport time, and waiting time in the slaughterhouse.

To optimize the gas stunning it is furthermore necessary to be able to continuously consider all these parameters prior to and during gas stunning of the poultry supplies delivered to the slaughterhouse, and continuously apply the most advantageous parameters to achieve optimum gas stunning of the actual chicken flock at any time to be stunned and slaughtered, respectively.

To optimize these parameters, different periods of stunning time can be used, but variations in the gas concentration, and variations of gas concentration in the different sections of the conveying route must also be taken into account, depending on the transport route length and transport route location in the stunning chamber.

The gas concentration may be monitored and controlled by means of sensors having different locations, and a PLC control system. Adjustment of the stunning time and concurrent variation of the gas concentration requires a change in the previously used methods by which a given slaughtering capacity of number of birds per minute required a fixed conveying time through stunning chamber. A given rate of slaughtering slaughtering capacity will always be determined by other subsequent parameters that cannot be changed immediately. Consequently it may furthermore be necessary to be able to change the degree of stunning, depending on the condition of the poultry upon arrival at the slaughterhouse and unloading for slaughter.

SUMMARY OF THE INVENTION

The invention provides an improved method for gas stunning of poultry for slaughter, which method by means of simple provisions and means makes it possible to optimize the stunning by being able to consider all the mentioned parameters.

The method according to the invention adjusts the influence of the gas for stunning of the animals by shortening or prolonging the conveying time and/or the conveying route of the transport crates through the stunning chamber. It has surprisingly appeared that by means of such simple provisions it is possible to optimize the stunning, and at the same time consider all the above parameters. As an especially important thing it should be noted that at the same time it is possible to consider the welfare of the animals by observing the stunning condition of the animals before they reach the actual slaughter. If the stunning condition of the animals is not optimum, it will be easy to prolong or shorten the conveying time and/or conveying route through the stunning chamber.

An optimum condition of stunning will be that the animals are so well stunned that they with certainty do not awaken before they reach slaughtering. On the other hand it is also important that the animals do not die in stunning because it is important that the pump function of the heart is maintained in order to contribute to the pumping out of blood when the necks of the animals are cut in the actual slaughter.

By the invention a method is appropriately used by which the adjustment of the conveying time through the stunning chamber is achieved by increasing or reducing the speed of the conveyors.

By the method according to the invention it may furthermore be advantageous that the adjustment of the conveying route through the stunning chamber is effected by lowering or lifting a substantially horizontal conveyor running herein, which conveyor provides for the conveying of the transport crates between a downwards running conveyor and an upwards running conveyor.

Furthermore, the method according to the invention may be modified in such a way that the influence of the gas for stunning of the animals moreover is adjusted by varying the gas concentration at varying heights in the stunning chamber in that increasing gas concentration is appropriately applied in a direction downwards in the stunning chamber.

The invention furthermore relates to a system for gas stunning of poultry for slaughter comprising a substantially horizontal conveyor which is arranged for receiving and introducing transport crates comprising poultry for slaughter to a gas-filled stunning chamber in which a downwards running conveyor is arranged, for successively conveying transport crates downwards in the stunning chamber, and an upwards running conveyor, which successively conveys the transport crates upwards and out of the stunning chamber, in which system the downwards running conveyor is constituted by a number of substantially vertical conveyors each comprising mutually interacting endless chain conveyors with carrying means arranged for supporting opposite sides of the transport crates for downwards conveying thereof in the stunning chamber, that the upwards running conveyor is constituted by a substantially vertical conveyor comprising mutually interacting endless chain conveyors with carrying means arranged for supporting opposite sides of the transport crates for upwards conveying thereof from the stunning chamber, and that, between the downwards and upwards running conveyors, there is a substantially horizontal conveyor for providing the horizontal conveying of the transport crates through the stunning chamber, which latter conveyor furthermore is an entity for being lifted and lowered respectively between levels with varying gas concentrations in the stunning chamber.

Appropriately, the system according to the invention is provided in such a way that the stunning chamber is divided into a number of horizontal zones, for example, three zones, namely, the lower zone having a gas concentration ($CO_2$) in the order of 50% (app. 45–51%), an intermediate zone having a gas concentration ($CO_2$) in the order of 25% (app. 32–46%), and an upper zone having a gas concentration ($CO_2$) in the order of 5% (app. 8–10%), in that sensors are provided in level with the upper zone limit for checking and control respectively of the gas concentration in the the zones.

The actual gas concentration percentage varies a great deal in connection with shift between pause and operation, and upon changed rate of motion of the transport crates. This variation in the gas concentration has relatively small influence on the stunning result, whereas the time of presence, especially in the first zone, and the total time of presence in the stunning chamber have great influence.

The system according to the invention is preferably provided in such a way that it comprises a PLC control system for controlling of a number of mutually dependent mechanical parameters, e.g. speed of vertical conveyors, setting (176 seconds), number of transport crates in stunning zone, setting (tunnel) (10 pcs.), cycle between crates in the stunning zone, setting (17.6 seconds), number of chickens per crate, setting (43 pcs.), speed of slaughtering line, setting (148 animals/minute), speed cycle between crates in stunning zones, actual (17.4 seconds), speed of slaughtering line, actual (142 animals/minute).

If one setting is changed, the other settings are changed correspondingly, for example if the birds are larger, it means that there are fewer animals in each transport crate, but the speed of the slaughtering line continues to be the same. Consequently it becomes necessary to convey more transport crates per minute through the stunning chamber, i.e. increased conveying speed. At the same time each individual bird is larger why it is stunned for a longer time, that is longer conveying time and conveying route respectively are required through the stunning chamber.

BRIEF DESCRIPTION OF DRAWING

The invention is explained in more details in the following with reference to the drawing in which.

DETAILED DESCRIPTION OF THE INVENTION

Figure 1:
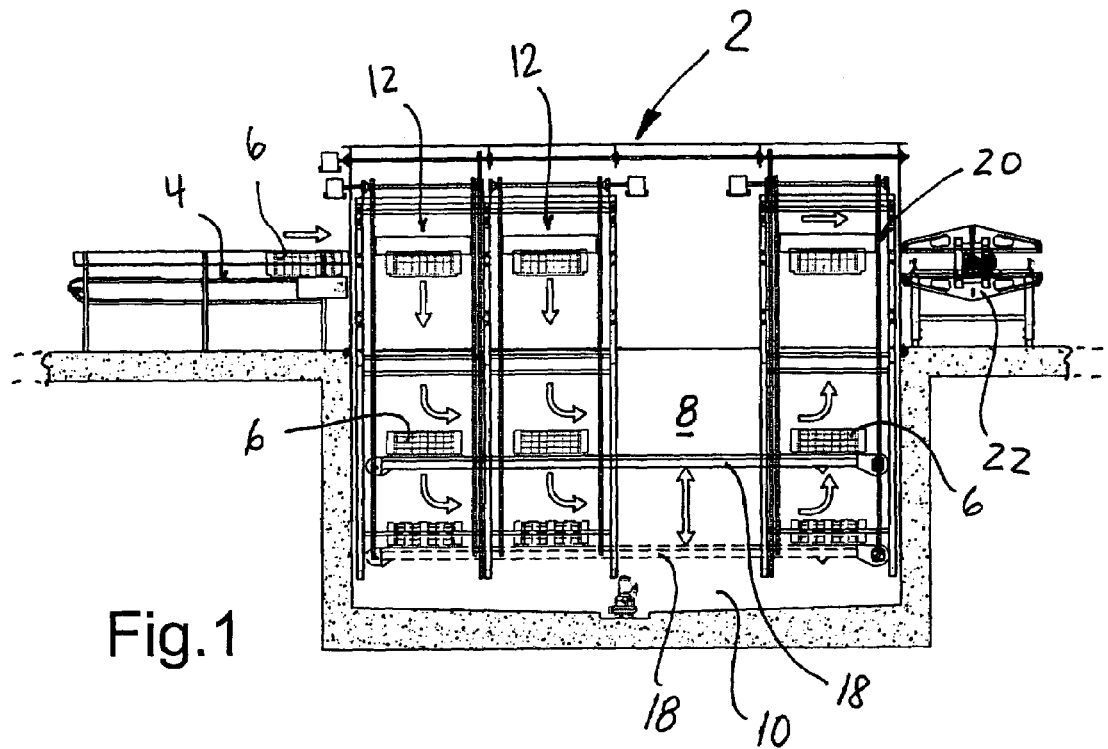
FIG. 1 shows a longitudinal sectional view through an embodiment of a system for gas stunning of poultry for slaughter according to the invention.

The system 2 shown in FIG. 1 for gas stunning of poultry for slaughter comprises a supply conveyor 4 for supply to the stunning system 2 of standard transport crates 6 comprising live poultry, which for example arrive at the slaughterhouse by truck.

The stunning system 2 comprises a stunning chamber 8, the major part of which consists of a concrete pit 10 lowered in relation to the floor level, which chamber 8 is filled with stunning gas, by way of example. $CO^2$ with varying gas concentrations, that is an upper, first zone having a gas concentration in the order of 9% (app. 8–10%), an intermediate, second zone having a gas concentration in the order of 39% (app. 32–46%), and a lower, third zone having a gas concentration in the order of 48.5% (app. 45–51%). The gas concentration in the respective zones is controlled by suitable gas sensors and an actually known gas filling/control system with belonging filling valves.

Figure 2:
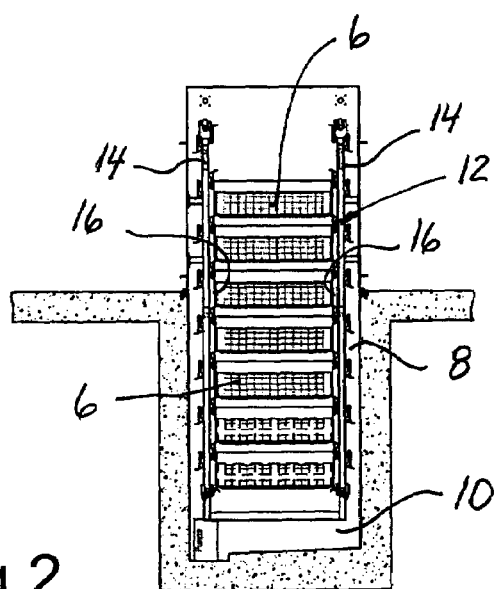
FIG. 2 shows a transverse sectional view through a vertical conveyor of the system according to the invention shown in FIG. 1.

From the supply conveyor 4, the transport crates 6 are successively conveyed into a vertical downwards conveying conveyor 12, which, as shown most clearly in FIG. 2, has a number of mutually interacting endless chain conveyors 14 with carrying means 16, which are arranged for supporting opposite sides of the transport crates 6 for downwards conveying of these in the stunning chamber 8 until the transport crates 6 are transferred to a horizontal conveyor 18 arranged in a vertical displaceable way, which conveyor 18 provides for the transport crates 6 being re-transferred to a vertical upwards running conveyor 20 of the same type as the endless chain conveyors.

From the conveyor 20, the transport crates 6 comprising stunned poultry are transferred to a crate turning unit 22 which provides for turning the transport crates 6 for further conveying with the bottoms turning upwards on the conveyor for unloading of the stunned chickens and further conveying and shackling of these on slaughter line. Shortly after the stunned chickens have been shackled by their legs in slaughter shackles, the chickens pass a slaughter location where their necks are cut so that the chickens bleed out as the pumping function of their hearts is still intact if the gas stunning is optimum.

If it can be found that the gas stunning is either to deep, that is the chickens are already dead, the stunning must be adjusted by shortening the conveying route and/or conveying time through the stunning chamber so that the stunning becomes lighter. If the chickens on the contrary show signs of too light stunning, the stunning must likewise be adjusted so that the conveying route and/or conveying time through the stunning chamber are increased. In both situations, adjustment can be effected by lifting or lowering the horizontal conveyor 18 so that a simultaneous adjustment of the actual gas concentration is effected, which gas concentration is increasing in the downwards direction of the stunning chamber 8.

Sensors in a given location ensure that the horizontal conveyor 18 is in a correct position for example for small, medium-sized, or large chickens. An important thing which also influences the stunning result is that the transport crates 6 comprising chickens are conveyed downwards slowly step by step by means of the conveyor 12, starting in a low gas concentration of app. 5–10%. The stepwise downwards conveying ensures that the chickens at start and stop lift their heads whereby they can freely breathe in the relatively low gas concentration. This prevents the poultry from becoming stressed, and injuries are avoided.

To prolong the conveying time through the stunning chamber 8 downwards conveying by two or more conveyors 14 is also possible, while upwards conveying still is by only one conveyor 20 because the important thing is to reduce the time as much as possible that passes from full stunning until shackling in the slaughter shackles.

After the first part of the downwards movement, the poultry has "fallen asleep", and the crates continue further down where the gas concentration is max. 50% at the bottom of the chamber. Hereby it is ensured that the chickens will not wake up before their necks have been cut and they have bled out. As regards safety it is furthermore an advantage to lower the stunning chamber to below floor level so that gas leakage above head height is avoided.

In order to prevent excitement and stress of the poultry to be slaughtered it is important that the gas concentration at the beginning of the stunning is not too high. On the other hand it is also important to be able to work with an almost constant capacity of the stunning system by way of example a capacity of about 140 animals/minute so that the stunning system by large poultry may work with high conveying speed and possible longer conveying route and low gas concentration and by small poultry may work with low conveying speed and low gas concentration.

| PLC control-displayed: | |
| --- | --- |
| Speed of stackers - Setting | 176 seconds |
| Number of crates intunnel - Setting: | 10 pcs. |
| Cycle tunnel - Setting: | 17.6 seconds |
| Chickens/crate - Setting: | 43 pcs. |
| Line speed - Setting: | 148 animals/minute |
| Speed cycle - Actual: | 17.4 seconds |
| Speed - Actual: | 142 animals/minute |
| $CO^2$ gas settings | | |
| --- | --- | --- |
| Tunnel zone 1 | Setting: 5% | Actual: 8–10% |
| Tunnel zone 2 | Setting: 25% | Actual: 32–46% |
| Tunnel zone 3 | Setting: 50% | Actual: 45–51% |

The invention claimed is:

1. A method for gas stunning of animals for slaughter arriving at a slaughterhouse in transport crates, where gas stunning of the animals is achieved while the animals are still in the transport crates, and where the transport crates and the animals, are conveyed successively by means of conveyors through a stunning chamber, wherein an influence of the gas for stunning the animals is adjusted while the animals are within the stunning gas by shortening or lengthening a conveying time during which the animals travel within the stunning gas and adjusting a length of conveying by changing the configuration of the path of travel of the transport crates on the conveyor travelled by the animals within the stunning gas within the transport crates through the stunning chamber.

2. A method according to claim 1, wherein shortening or lengthening of the conveying time through the stunning chamber is achieved by increasing or reducing a speed of the conveyors.

3. A method according to claim 1, wherein adjustment of the length of conveying through the stunning chamber is achieved by lowering or lifting a substantially horizontal conveyor running therein, which conveyor provides for the conveying of the transport crates through the stunning chamber within the gas for stunning between a downwards running conveyor and an upwards running conveyor.

4. A method according to claim 2, wherein adjustment of the length of conveying through the stunning chamber is achieved by lowering or lifting a substantially horizontal conveyor running herein, which conveyor provides for the conveying of the transport crates through the stunning chamber within the gas for stunning between a downwards running conveyor and an upwards running conveyor.

5. A method according to claim 1, wherein an influence of the gas for stunning the animals is adjusted by varying gas concentration at varying levels in the stunning chamber with an increasing gas concentration being applied in a downwards direction in the stunning chamber.

6. A method according to claim 2, wherein an influence of the gas for stunning the animals is adjusted by varying gas concentration at varying levels in the stunning chamber with an increasing gas concentration being applied in a downwards direction in the stunning chamber.

7. A method according to claim 3, wherein an influence of the gas for stunning the animals is adjusted by varying gas concentration at varying levels in the stunning chamber with an increasing gas concentration being applied in a downwards direction in the stunning chamber.

8. A method according to claim 4, wherein an influence of the gas for stunning the animals is adjusted by varying gas concentration at varying levels in the stunning chamber with an increasing gas concentration being applied in a downwards direction in the stunning chamber.

9. A system for gas stunning of animals for slaughter according to the method of claim 1 comprising a first substantially horizontal conveyor which receives and introduces transport crates and the animals for slaughter into a gas-filled stunning chamber in which a downwards running conveyor is arranged, for successively conveying transport crates downwards in the stunning chamber, and an upwards running conveyor which is arranged for successively conveying the transport crates upwards out of the stunning chamber, wherein the downwards running conveyor comprises substantially vertical conveyors, each comprising mutually interacting endless chain conveyors which support opposite sides of the transport crates for downwards conveying of the transport crates in the stunning chamber, the upwards running conveyor comprises a substantially vertical conveyor comprising mutually interacting endless chain conveyors which support opposite sides of the transport crates for upwards conveying from the stunning chamber, and between the downwards and upwards running conveyors there is a second substantially horizontal conveyor which provides horizontal conveying of the transport crates through the stunning chamber, which second horizontal conveyor furthermore is lifted and lowered respectively between levels with varying gas concentrations in the stunning chamber.

10. A system for gas stunning of animals for slaughter according to the method of claim 2 comprising a first substantially horizontal conveyor which receives and introduces transport crates and the animals for slaughter into a gas-filled stunning chamber in which a downwards running conveyor is arranged, for successively conveying transport crates downwards in the stunning chamber, and an upwards running conveyor which is arranged for successively conveying the transport crates upwards out of the stunning chamber, wherein the downwards running conveyor comprises substantially vertical conveyors, each comprising mutually interacting endless chain conveyors which support opposite sides of the transport crates for downwards conveying of the transport crates in the stunning chamber, the upwards running conveyor comprises a substantially vertical conveyor comprising mutually interacting endless chain conveyors which support opposite sides of the transport crates for upwards conveying from the stunning chamber, and between the downwards and upwards running conveyors there is a second substantially horizontal conveyor which provides horizontal conveying of the transport crates through the stunning chamber, which second horizontal conveyor furthermore is lifted and lowered respectively between levels with varying gas concentrations in the stunning chamber.

11. A system for gas stunning of animals for slaughter according to the method of claim 3 comprising a first substantially horizontal conveyor which receives introduces transport crates and the animals for slaughter into a gas-filled stunning chamber in which a downwards running conveyor is arranged, for successively conveying transport crates downwards in the stunning chamber, and an upwards running conveyor which is arranged for successively conveying the transport crates upwards out of the stunning chamber, wherein the downwards running conveyor comprises substantially vertical conveyors, each comprising mutually interacting endless chain conveyors which support opposite sides of the transport crates for downwards conveying of the transport crates in the stunning chamber, the upwards running conveyor comprises a substantially vertical conveyor comprising mutually interacting endless chain conveyors which support opposite sides of the transport crates for upwards conveying from the stunning chamber, and between the downwards and upwards running conveyors there is a second substantially horizontal conveyor which provides horizontal conveying of the transport crates through the stunning chamber, which second horizontal conveyor furthermore is lifted and lowered respectively between levels with varying gas concentrations in the stunning chamber.

12. A system for gas stunning of animals for slaughter according to the method of claim 4 comprising a first substantially horizontal conveyor which receives introduces transport crates and the animals for slaughter into a gas-filled stunning chamber in which a downwards running conveyor is arranged, for successively conveying transport crates downwards in the stunning chamber, and an upwards running conveyor which is arranged for successively conveying the transport crates upwards out of the stunning chamber, wherein the downwards running conveyor comprises substantially vertical conveyors, each comprising mutually interacting endless chain conveyors which support opposite sides of the transport crates for downwards conveying of the transport crates in the stunning chamber, the upwards running conveyor comprises a substantially vertical conveyor comprising mutually interacting endless chain conveyors which support opposite sides of the transport crates for upwards conveying from the stunning chamber, and between the downwards and upwards running conveyors there is a second substantially horizontal conveyor which provides horizontal conveying of the transport crates through the stunning chamber, which second horizontal conveyor furthermore is lifted and lowered respectively between levels with varying gas concentrations in the stunning chamber.

13. A system for gas stunning of animals for slaughter according to the method of claim 5 comprising a first substantially horizontal conveyor which receives introduces transport crates and the animals for slaughter into a gas-filled stunning chamber in which a downwards running conveyor is arranged, for successively conveying transport crates downwards in the stunning chamber, and an upwards running conveyor which is arranged for successively conveying the transport crates upwards out of the stunning chamber, wherein the downwards running conveyor comprises substantially vertical conveyors, each comprising mutually interacting endless chain conveyors which support opposite sides of the transport crates for downwards conveying of the transport crates in the stunning chamber, the upwards running conveyor comprises a substantially vertical conveyor comprising mutually interacting endless chain conveyors which support opposite sides of the transport crates for upwards conveying from the stunning chamber, and between the downwards and upwards running conveyors there is a second substantially horizontal conveyor which provides horizontal conveying of the transport crates through the stunning chamber, which second horizontal conveyor furthermore is lifted and lowered respectively between levels with varying gas concentrations in the stunning chamber.

14. A system for gas stunning of animals for slaughter according to the method of claim 6 comprising a first substantially horizontal conveyor which receives introduces transport crates and the animals for slaughter into a gas-filled stunning chamber in which a downwards running conveyor is arranged, for successively conveying transport crates downwards in the stunning chamber, and an upwards running conveyor which is arranged for successively conveying the transport crates upwards out of the stunning chamber, wherein the downwards running conveyor comprises substantially vertical conveyors, each comprising mutually interacting endless chain conveyors which support opposite sides of the transport crates for downwards conveying of the transport crates in the stunning chamber, the upwards running conveyor comprises a substantially vertical conveyor comprising mutually interacting endless chain conveyors which support opposite sides of the transport crates for upwards conveying from the stunning chamber, and between the downwards and upwards running conveyors there is a second substantially horizontal conveyor which provides horizontal conveying of the transport crates through the stunning chamber, which second horizontal conveyor furthermore is lifted and lowered respectively between levels with varying gas concentrations in the stunning chamber.

15. A system for gas stunning of animals for slaughter according to the method of claim 7 comprising a first substantially horizontal conveyor which receives introduces transport crates and the animals for slaughter into a gas-filled stunning chamber in which a downwards running conveyor is arranged, for successively conveying transport crates downwards in the stunning chamber, and an upwards running conveyor which is arranged for successively conveying the transport crates upwards out of the stunning chamber, wherein the downwards running conveyor comprises substantially vertical conveyors, each comprising mutually interacting endless chain conveyors which support opposite sides of the transport crates for downwards conveying of the transport crates in the stunning chamber, the upwards running conveyor comprises a substantially vertical conveyor comprising mutually interacting endless chain conveyors which support opposite sides of the transport crates for upwards conveying from the stunning chamber, and between the downwards and upwards running conveyors there is a second substantially horizontal conveyor which provides horizontal conveying of the transport crates through the stunning chamber, which second horizontal conveyor furthermore is lifted and lowered respectively between levels with varying gas concentrations in the stunning chamber.

16. A system for gas stunning of animals for slaughter according to the method of claim 8 comprising a first substantially horizontal conveyor which receives introduces transport crates and the animals for slaughter into a gas-filled stunning chamber in which a downwards running conveyor is arranged, for successively conveying transport crates downwards in the stunning chamber, and an upwards running conveyor which is arranged for successively conveying the transport crates upwards out of the stunning chamber, wherein the downwards running conveyor comprises substantially vertical conveyors, each comprising mutually interacting endless chain conveyors which support opposite sides of the transport crates for downwards conveying of the transport crates in the stunning chamber, the upwards running conveyor comprises a substantially vertical conveyor comprising mutually interacting endless chain conveyors which support opposite sides of the transport crates for upwards conveying from the stunning chamber, and between the downwards and upwards running conveyors there is a second substantially horizontal conveyor which provides horizontal conveying of the transport crates through the stunning chamber, which second horizontal conveyor furthermore is lifted and lowered respectively between levels with varying gas concentrations in the stunning chamber.

17. A system according to claim 9, wherein the stunning chamber is divided into horizontal zones, comprising a lower zone having a gas concentration of the gas for stunning approximately of 45–51%, an intermediate zone having a gas concentration approximately of 32–46%, and an upper zone having a gas concentration approximately of 8–10%, wherein sensors are provided for monitoring and control respectively of the gas concentration in the zones.

18. A system according to claim 10, wherein the stunning chamber is divided into horizontal zones, comprising a lower zone having a gas concentration of the gas for stunning approximately of 45–51%, an intermediate zone having a gas concentration approximately of 32–46%, and an upper zone having a gas concentration approximately of 8–10%, wherein sensors are provided for monitoring and control respectively of the gas concentration in the zones.

19. A system according to claim 11, wherein the stunning chamber is divided into horizontal zones, comprising a lower zone having a gas concentration of the gas for stunning approximately of 45–51%, an intermediate zone having a gas concentration approximately of 32–46%, and an upper zone having a gas concentration approximately of 8–10%, wherein sensors are provided for monitoring and control respectively of the gas concentration in the zones.

20. A system according to claim 12, wherein the stunning chamber is divided into horizontal zones, comprising a lower zone having a gas concentration of the gas for stunning approximately of 45–51%, an intermediate zone having a gas concentration approximately of 32–46%, and an upper zone having a gas concentration approximately of 8–10%, wherein sensors are provided for monitoring and control respectively of the gas concentration in the zones.

21. A system according to claim 13, wherein the stunning chamber is divided into horizontal zones, comprising a lower zone having a gas concentration of the gas for stunning approximately of 45–51%, an intermediate zone having a gas concentration approximately of 32–46%, and an upper zone having a gas concentration approximately of 8–10%, wherein sensors are provided for monitoring and control respectively of the gas concentration in the zones.

22. A system according to claim 14, wherein the stunning chamber is divided into horizontal zones, comprising a lower zone having a gas concentration of the gas for stunning approximately of 45–51%, an intermediate zone having a gas concentration approximately of 32–46%, and an upper zone having a gas concentration approximately of 8–10%, wherein sensors are provided for monitoring and control respectively of the gas concentration in the zones.

23. A system according to claim 15, wherein the stunning chamber is divided into horizontal zones, comprising a lower zone having a gas concentration of the gas for stunning approximately of 45–51%, an intermediate zone having a gas concentration approximately of 32–46%, and an upper zone having a gas concentration approximately of 8–10%, wherein sensors are provided for monitoring and control respectively of the gas concentration in the zones.

24. A system according to claim 16, wherein the stunning chamber is divided into horizontal zones, comprising a lower zone having a gas concentration of the gas for stunning approximately of 45–51%, an intermediate zone having a gas concentration approximately of 32–46%, and an upper zone having a gas concentration approximately of 8–10%, wherein sensors are provided for monitoring and control respectively of the gas concentration in the zones.

25. A system according to claim 9, wherein a PLC control system controls mutually dependent mechanical parameters of a speed of vertical conveyors, a number of transport crates in the stunning zones, a cycle of crates in the stunning zone, a number of animals per crate, a speed of a slaughtering line and a speed cycle between crates in the stunning zone.

26. A system according to claim 10, wherein a PLC control system controls mutually dependent mechanical parameters of a speed of vertical conveyors, a number of transport crates in the stunning zones, a cycle of crates in the stunning zone, a number of animals per crate, a speed of a slaughtering line and a speed cycle between crates in the stunning zone.

27. A system according to claim 10, wherein a PLC control system controls mutually dependent mechanical parameters of a speed of vertical conveyors, a number of transport crates in the stunning zones, a cycle of crates in the stunning zone, a number of animals per crate, a speed of a slaughtering line and a speed cycle between crates in the stunning zone.

28. A system according to claim 11, wherein a PLC control system controls mutually dependent mechanical parameters of a speed of vertical conveyors, a number of transport crates in the stunning zones, a cycle of crates in the stunning zone, a number of animals per crate, a speed of a slaughtering line and a speed cycle between crates in the stunning zone.

29. A system according to claim 12, wherein a PLC control system controls mutually dependent mechanical parameters of a speed of vertical conveyors, a number of transport crates in the stunning zones, a cycle of crates in the stunning zone, a number of animals per crate, a speed of a slaughtering line and a speed cycle between crates in the stunning zone.

30. A system according to claim 13, wherein a PLC control system controls mutually dependent mechanical parameters of a speed of vertical conveyors, a number of transport crates in the stunning zones, a cycle of crates in the stunning zone, a number of animals per crate, a speed of a slaughtering line and a speed cycle between crates in the stunning zone.

31. A system according to claim 14, wherein a PLC control system controls mutually dependent mechanical parameters of a speed of vertical conveyors, a number of transport crates in the stunning zones, a cycle of crates in the stunning zone, a number of animals per crate, a speed of a slaughtering line and a speed cycle between crates in the stunning zone.

32. A system according to claim 15, wherein a PLC control system controls mutually dependent mechanical parameters of a speed of vertical conveyors, a number of transport crates in the stunning zones, a cycle of crates in the stunning zone, a number of animals per crate, a speed of a slaughtering line and a speed cycle between crates in the stunning zone.

33. A system according to claim 16, wherein a PLC control system controls mutually dependent mechanical parameters of a speed of vertical conveyors, a number of transport crates in the stunning zones, a cycle of crates in the stunning zone, a number of animals per crate, a speed of a slaughtering line and a speed cycle between crates in the stunning zone.

* * * * *